Aug. 25, 1953  E. L. WEBB ET AL  2,650,309
SCINTILLATION COUNTER AND COMPOSITE
PHOSPHOR THEREFOR
Filed April 27, 1950

WITNESSES:
Edward Michaels
W. C. Groome

INVENTORS
Edward L. Webb &
Roy C. Fox.
BY
Frederick Shafer
ATTORNEY

Patented Aug. 25, 1953

2,650,309

UNITED STATES PATENT OFFICE 2,650,309

SCINTILLATION COUNTER AND COMPOSITE PHOSPHOR THEREFOR

Edward L. Webb, Baltimore, and Roy C. Fox, Pasadena, Md., assignors to Westinghouse Electric Corporation, East Pittsburgh, Pa., a corporation of Pennsylvania Application April 27, 1950, Serial No. 158,356

8 Claims. (Cl. 250—71)

This invention relates to scintillation counters embodying a composite phosphor and such composite phosphors.

A number of phosphor compositions giving off light when excited by gamma radiation are known in the art, however, the light output bears little relation to the energy of the gamma radiation. In particular the light output is not proportional to the Roentgen-rate over a wide range of gamma energies or wavelengths.

Also, many of the known materials do not have a constant output of light when excited by a given gamma radiation if the temperature of the phosphor is varied. Further many phosphors exhibit directional response to gamma radiation.

The term "Roentgen" has been defined, and accepted as an international standard, in terms of the ionization produced in a given weight of air when gamma and X-rays pass therethrough. There is a close correlation between the Roentgen-rate of gamma and X-ray energy and the biological effects of such radiant energy. Gamma rays and X-rays are quite similar differing mainly in their origin.

The object of the present invention is to provide a composite phosphor from which the output of light when exposed to gamma radiation is proportional to Roentgen-rate over a wide range of gamma and X-ray energy.

A further object of the invention is to provide a composite phosphor that has relatively constant output of light for a given rate of gamma radiation over a wide temperature range.

A still further object of the invention is to provide a scintillation counter capable of indicating accurately the Roentgen-rate of gamma and X-ray radiation over a wide range of energies and a variety of temperature conditions.

Other objects of the invention will in part be obvious and will in part appear hereinafter.

Figure 1:
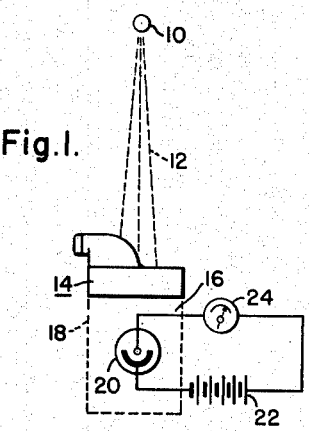
Figure 2:
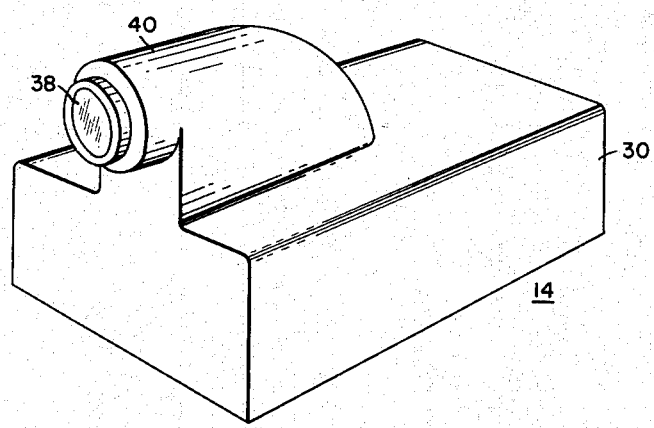

For a better understanding of the nature and objects of the invention, reference should be had to Figure 1 of the drawing wherein is illustrated schematically a scintillation counter constructed in accordance with the invention. Figure 2 is a perspective view of the phosphor-containing portion of the scintillation counter, and Figure 3 is a cross section of the structure of Figure 2 in reduced size, and with the cover in place.

We have discovered certain composite phosphors that have a light output directly proportional to the Roentgen-rate of gamma and X-ray radiation which strikes the phosphors, such light output being substantially unaffected by moderate changes in temperature, the energy of the radiation, or directional effects. These composite phosphors are useful in the determination of the presence of and the relative biological effects of gamma and X-ray radiation, because when excited thereby they convert the radiation to light radiation which is readily capable of being detected and measured with conventional photoelectric instruments. Gamma radiation of from below 0.1 to 2 m. e. v. is difficult to detect and measure directly with accuracy with any known instrument; however, the composite phosphors of the present invention, when gamma radiation of this energy impinges thereon, have been found to produce light in an amount such that when measured with a photoelectric device, is proportional to the Roentgen-rate of the gamma radiation.

Referring to Figure 1 of the drawing, there is illustrated schematically scintillation counting apparatus embodying the present invention. A source 10 of gamma or X-ray radiation, which may be a radioactive material, an X-ray tube or other radiating means, produces high-intensity radiation indicated at 12. The scintillation counter of the present invention, indicated generally as 16, comprises a light-tight housing 18, a part of which is a holder 14 containing a composite phosphor responsive to the radiation to produce light. Within the housing 18 is disposed a phototube 20 so located with respect to the phosphor that light from the phosphor will strike and actuate the phototube 20. For the purpose of the invention, it is preferred that the phototube 20 be a multiplier phototube having a high order of amplification. An amplification of the magnitude of the order of one million is desirable for most purposes inasmuch as the light output from the phosphor is low even under excitation from high energy gamma radiation. A 931-A or 1-P-21 phototube is preferred though other phototubes may be employed for this purpose. The output from the phototube is connected in circuit relation with a suitable source of direct current 22 such as a battery or a rectifier and a suitable microammeter 24. The microammeter 24 may be calibrated in any suitable manner. The entire electrical circuit and the ammeter 24 may be enclosed within the light-tight housing 18. Alternatively, the source of direct current 22 and the ammeter may be kept separate from the housing. The phototube may even be connected to a remotely controlled recording or indicating device. A vacuum tube electrometer may be connected across a suitable resistor in series with the anode of the multiplier phototube 20 if required to operate the microammeter 24.

Figure 3:
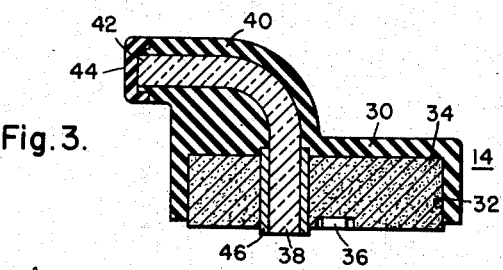

Referring to Figures 2 and 3 of the drawing, there is illustrated in detail the construction of the holder 14 containing the phosphor of the scintillation counter. The holder 14 comprises an opaque shell 30 made from a molded plastic such as phenol-formaldehyde, hard rubber, or other resin or plastic preferably pigmented heavily to prevent the passage of any substantial amount of light which would actuate the phototube but penetrable by gamma and X-ray radiation. The shell 30 can be made of a metal penetrable by the radiation. The shell 30 has a recess 32 within which is disposed a crystal 34 preferably composed of an organic polycyclic compound that has phosphorescent characteristics whereby light is produced when it is excited by gamma radiation or X-rays. It is preferable that the organic phosphor be a material that has a considerable light output at about 4,000 Å. since the peak sensitivity of high-gain multiplier phototubes occurs at about this wavelength. The crystal 34 may be conveniently made of a single crystal of a suitable polycyclic organic compound or it may be prepared from a number of crystals fitted together in the recess 32. There is disposed in contact with the organic polycyclic phosphor 34 a smaller amount by weight of an inorganic phosphor 36 also capable of emitting light when excited by gamma radiation. The position of the smaller amount of the inorganic phosphor is preferably at the lower face of the crystal 34, that is, at the side nearest the phototube 20. However, the inorganic phosphor may be located at any other point with respect to the organic phosphor 34, though somewhat larger amounts of the inorganic phosphor 36 will be required to produce the same result than when at the more favorable position shown. If located at the sides or at more remote points from the face of the crystal 34 that is nearest the phototube a considerably higher proportion of inorganic phosphor is required. The use of a single crystal of the inorganic phosphor is desirable since the least amount thereof will be required for a given result. However, the inorganic phosphor 36 may be powdered and the powder applied to the face of the crystal 34 or disposed within the interior of the crystal 34, for example, by dividing the crystal 34 into two pieces and disposing the powder in a thin layer between the two pieces. The finer the powder, the greater the quantity of the inorganic phosphor that will be required.

For the purpose of calibrating the phototube 20 and the microammeter 24, there is provided a light-conducting member 38 in the form of a bent rod, the rod member 38 passing through a projection 40 formed in the shell 30 and terminating at the point 42 where a light-tight cover 44 is provided to prevent external light capable of actuating the phototube from entering during normal use of the counter. A sleeve 46 is provided between the crystal 34 and the rod member 38. When it is desired to calibrate the apparatus, the cover 44 is removed and light of a predetermined intensity and suitable wavelength is applied to the face 42 of the rod member 38. The rod member 38 is constructed of a material such as quartz or polymethyl methacrylate or other resin that has a high index of refraction such that light is conducted therealong and emitted at the other face inside the housing 18. The light emitted from the end of the rod 38 is directed at the phototube 20. Numerous other light-conducting plastics, such as polystyrene and polyester resinous polymers, are known. For example, the reaction product of monostyrene and castor oil-maleate resin prepared and combined as disclosed in N. C. Foster Patent No. 2,484,215 is suitable for this purpose.

In using the scintillation counter, the entire housing 18 is brought into a field of gamma radiation or X-rays. The gamma radiation readily passes through the shell 30 and excites the phosphor 34—36 thereby producing light which strikes the phototube 20 and thereby actuates the microammeter 24. The reading on the microammeter will indicate the amount or the energy of the gamma radiation or the X-rays. The microammeter may be calibrated in Roentgen rates or other suitable indicia.

Examples of organic polycyclic compounds suitable for use as photoelectron-emitting phosphors are anthracene, naphthalene, phenanthrene and stilbene. Numerous other polycyclic organic compounds and, in particular, polycarbocyclic compounds may be employed. We have had considerable success with anthracene. Anthracene is available in crystals of such size that one or only a few crystals at most are sufficient for making a practical sized scintillation counter. Numerous inorganic phosphors are available for use in making the composite phosphor. Examples thereof are cadmium tungstate, calcium titanium silicate, calcium titanium stannate, cocrystallization products of lanthanum silicate-cerium oxide, calcium orthophosphate-stannate, and calcium orthophosphate-cerium oxide. Cadmium tungstate has given excellent results in service.

We have prepared a composite phosphor arranged as shown in Figure 3 of the drawing wherein a crystal of anthracene 34 had a recess formed therein, and a single crystal 36 of cadmium tungstate was inserted therein. The composite crystal was comprised of 99.5% of anthracene and 0.5% by weight of cadmium tungstate. When exposed to gamma radiation over a range of from 0.1 to 2 m. e. v., the light output therefrom was approximately ±5% of the Roentgenrate reading. The cadmium tungstate crystal may comprise as little as 0.05% and up to 1% of the weight of the anthracene.

For gamma radiation below 0.1 m. e. v., an excellent composite phosphor combination comprises from 92% to 97% by weight of anthracene and from 3% to 8% by weight of an inorganic phosphor composed of the co-crystallized product of 98 mole percent of calcium orthophosphate activated with two mole percent of tin oxide. Very close correlation between the gamma radiation and the photoelectron output is secured with this combination even for low energy gamma radiation.

The organic phosphors of this invention are substantially non-directional; that is, the source of gamma radiation 10 in Figure 1 of the drawing may be moved with respect to the plane of the phosphor-containing holder 14 with the light output from the phosphor and the indicated Roentgen-rate response being substantially unimpaired as long as the distance from the source 10 to the holder 14 is constant. Likewise, the light output from the composite phosphor is constant over a wide range of temperatures from about −50° C. to +50° C.

No particular proportions of the inorganic to the organic phosphor can be given for all conditions of use since the particle size and position of the inorganic phosphor to the main body of the organic phosphor are factors affecting the amount required to produce a given result. Thus, we have found with anthracene as much as 10% of finely powdered cadmium tungstate may be required to give the same results as secured with only 0.5% by weight of a single crystal of cadmium tungstate, the latter being positioned as shown in Figure 3 of the drawing. For most purposes not more than 20% of the composite phosphor need be the inorganic phosphor, though larger proportions may be required in some instances. In no case, however, have we found that the amount of the inorganic phosphor need exceed the amount of the organic phosphor to secure improved results. It will be understood that a more uniform light output, as correlated to Roentgen-rate of the gamma radiation, is secured from the composite phosphors of the present invention than is obtained by using either alone as long as the amount of inorganic phosphor is less than the amount of the organic phosphor. The optimum amount which gives the most accurate light output in terms of Roentgen-rate will vary with the composition, the size of the crystals, and the position with respect to the main body of the organic polycyclic compound.

The inorganic phosphors comprising two or more compounds are preferably cocrystallized from a common solution to produce a homogeneous crystal or crystals. Thus, crystals of calcium titanium silicate phosphor may be prepared by preparing a solution of calcium silicate admixed with from one to ten mole per cent of calcium titanite and the solution heated gently to drive off the solvent and precipitating a cocrystalline composition. It will be appreciated that it may require long periods of time of the order of several weeks to produce large sized crystals.

We have produced composite phosphor members by thoroughly admixing crystals of the organic phosphor, a smaller amount of the inorganic phosphor in finely divided form and a hardenable resinous composition that polymerizes to a light transparent solid resin. For example a substantially uniform mixture 10 parts of various sized anthracene crystals and 5 parts of cadmium tungstate of a fineness passing through a sieve of from 90 to 200 mesh was combined in 3 parts of a liquid polyester composition with 1% of its weight of benzoyl peroxide cataylst. The mixture was placed in a mold and heated for several hours at 125° C.; at the end of such heating there resulted a solid disk of the mixed phosphors embedded in a solid matrix of transparent polyester resin solid. The amount of the resin may be varied to meet requirements. The proportions of the organic and inorganic phosphor also may be varied. The fineness of the inorganic phosphor is preferably finer than that just passing through a 40 mesh sieve.

Suitable resinous compositions are those polymerizing to solids transparent to visual light. Examples of such resins are esters of allyl alcohol; acrylates; acrylic acid esters; mixtures of (a) from 10 to 95% by weight of polymerizable monomers having the group $H_2C=C<$ and (b) from 90% to 5% by weight of a polyester derived by reacting a polyhydric alcohol with an unsaturated acid compound selected from the group consisting of alpha, beta-ethylenically unsaturated dicarboxylic acids and anhydrides thereof, alone or admixed with saturated polycarboxylic acids; cellulose esters; cellulose ethers; vinyl esters; arylalkenes, and the like. Examples of such compositions are allyl carbonate, allyl acetate, allyl laurate, dimethallyl ether, monostyrene, solutions of polystyrene in monostyrene, acrylic acid, methyl methacrylate, n-butyl methyacrylate, cellulose acetate, ethyl cellulose, vinyl chloride-vinyl acetate, monostyrene solutions of propylene glycol maleate and diethylene glycol maleate-adipate.

The resinous compositions can be applied to the mixture of phosphors as a monomer or low polymer in which is dissolved a polymerization catalyst, such for example as an organic peroxide-tertbutyl perbenzoate and benzoyl peroxide for instance in amounts of from 0.01% to 2% or more—or a molten polymer which solidifies on cooling, such for example as cellulose acetate, or high solid concentration solutions, such for example as organosols of vinyl chloride-vinyl acetate copolymers. The resinous composition should form a solid resin that is relatively transparent to the visual light given off by the phosphor embedded therein when excited by gamma or X-ray radiation so as to allow such light to be emitted and reach the phototube in the scintillation counter.

The disks comprising the resin embedded phosphors are particularly suitable for use in a form of scintillation counter such as in Fig. 1 modified as follows: A light impermeable opaque partition is disposed in the housing 18 between the phosphor holder 14 and the phototube 20. The opaque partition is provided with an aperture that may be varied in size to control the amount of light that may reach the phototube from the phosphor 34. An iris type of diaphragm such as is used in cameras, with means for controlling it from the exterior if desired, may be employed. The size of the diaphragm may be regulated during the process of calibrating the apparatus with light of a suitable intensity applied to the light conducting rod member 38. Such variable size aperture enables the apparatus to be very easily and directly calibrated in Roentgens.

Since certain obvious changes may be made in the above and different embodiments of the invention could be made without departing from the scope thereof, it is intended that all matter contained in the above description shall be interpreted as illustrative and not in a limiting sense.

We claim as our invention:

1. In a scintillation counter comprising a light-tight housing permeable to gamma and X-ray radiation, the improvement comprising a phosphor member disposed in the housing comprising a main body of at least one crystal of an organic polycyclic phosphor producing light when excited by gamma and X-ray radiation the crystal being of substantial size and, disposed in contact with the organic phosphor, an inorganic phosphor also producing light when excited by gamma and X-ray radiation, the weight of the inorganic phosphor being present from significant amounts up to 100% of the weight of the organic phosphor, the combined phosphors having substantially non-directional scintillation characteristics in response to gamma radiation and having a more uniform correlation between light output Roentgen-rate when exposed to gamma and X-ray radiation than either alone.

2. In a scintillation counter, a light-tight housing permeable to gamma and X-ray radiation, and disposed in the housing a phosphor member comprising a main body of at least one large crystal of an organic polycyclic phosphor producing light when excited by gamma and X-ray radiation and, disposed in contact with the organic phosphor, a single crystal of an inorganic phosphor producing light when excited by gamma and X-ray radiation, the weight of the crystal of the inorganic phosphor being from about 0.05% to 20% of the weight of the organic phosphor, the combined phosphors having substantially non-directional scintillation characteristics and having a substantially more uniform correlation between light output and Roentgen-rate over a wide range of gamma and X-ray radiation as compared to either phosphor alone.

3. In a scintillation counter, a light-tight housing permeable to gamma and X-ray radiation, a phototube in the housing, the phototube being responsive to light, and a phosphor member so disposed in the housing with respect to the phototube that light given off by the phosphor will actuate the phototube, the phosphor member comprising a main body of at least one large crystal of an organic polycyclic phosphor producing light when excited by gamma and X-ray radiation and, disposed in contact with the organic phosphor, an inorganic phosphor also producing light when excited by gamma and X-ray radiation, the weight of the inorganic phosphor being a significant amount up to 100% of the weight of the organic phosphor, the combined phosphors having substantially non-directional light output characteristics in response to gamma and X-ray radiation and having a more uniform light output in relation to the Roentgen-rate when exposed to gamma and X-ray radiation than either alone.

4. In a scintillation counter, a light-tight housing permeable to gamma and X-ray radiation, a phototube in the housing, the phototube being responsive to light, and a phosphor member so disposed in the housing with respect to the phototube that light given off by the phosphor will actuate the phototube, the phosphor member comprising a main body of at least one large crystal of an organic polycyclic phosphor producing light when excited by gamma and X-ray radiation and, disposed in contact with the organic phosphor, a single crystal of an inorganic phosphor producing light when excited by gamma and X-ray radiation, the weight of the crystal of the inorganic phosphor being from about 0.05% to 20% of the weight of the organic phosphor, the combined phosphors having substantially non-directional light output characteristics and having a substantially more uniform light output in relation to the Roentgen-rate over a wide range of gamma and X-ray radiation as compared to either phosphor alone.

5. In a scintillation counter, a light-tight housing having walls permeable to gamma and X-ray radiation, a phototube in the housing, the phototube being responsive to light, and a phosphor member so disposed in the housing with respect to the phototube that light given off by the phosphor will actuate the phototube, and means passing through the walls of the housing for admitting light from the exterior and directing such light to the phototube from the position of the phosphor member for calibration of the phototube, said means including a removable light-tight cover, said last means being employed only when the phosphor is not fluorescing.

6. A composite phosphor member comprising a main body of crystalline anthracene and in contact therewith a single crystal of cadmium tungstate weighing from 0.05% to 1% of the weight of the anthracene.

7. A composite phosphor member comprising a main body of crystalline anthracene and in contact therewith from 3% to 8% based on the weight of the anthracene of crystals composed of calcium orthophosphate activated with two mole percent of tin oxide.

8. In a scintillation counter, a light-tight housing permeable to gamma and X-ray radiation, a phototube responsive to light disposed in the housing, a phosphor member so disposed in the housing that light given off by the member will actuate the phototube, a partition member opaque to light having an aperture capable of being varied disposed between the phosphor member and the phototube to enable control of the amount of the light given off by the phosphor member reaching the phosphor member, the phosphor comprising a substantially uniform mixture of 100 parts by weight of crystals of a polycyclic organic phosphor and from 0.05 to less than 100 parts by weight of an inorganic phosphor of a fineness of greater than 40 mesh, both phosphors producing light when excited by gamma and X-ray radiation, and a light transparent resin body in which the mixture of phosphors is embedded.

EDWARD L. WEBB.
ROY C. FOX.

References Cited in the file of this patent

UNITED STATES PATENTS

| Number | Name | Date |
|---|---|---|
| 868,779 | Hammer | Oct. 22, 1907 |
| 1,511,874 | Eder | Oct. 14, 1924 |
| 2,180,508 | De Fraine et al. | Nov. 21, 1939 |
| 2,189,623 | Bourland | Feb. 6, 1940 |
| 2,225,439 | Arens et al. | Dec. 17, 1940 |
| 2,470,449 | Williams | May 17, 1949 |

OTHER REFERENCES

Scintillation Counting With Anthracene, Bell et al., AECD–1889, April 20, 1948, 6 pages.

Solid Counters: "Scintillation Counters," Wouters, AECD–2203, June 30, 1948, pages 1–9.

Relative Sensitivities of Some Organic Compounds for Scintillation Counters, Taschek, AECD–2353, August 31, 1938, 3 pages.

Leverenz, Luminescence of Solids, 1950, p. 250.